United States Patent
Cerea

(10) Patent No.: US 9,567,529 B2
(45) Date of Patent: Feb. 14, 2017

(54) PROCESS AND APPARATUS FOR QUENCHING COKE

(71) Applicant: AMBIENTE E NUTRIZIONE S.R.L., Rozzano (IT)

(72) Inventor: Giuseppina Cerea, Rozzano (IT)

(73) Assignee: AMBIENTE E NUTRIZIONE S.R.L., Rozzano (IT)

( * ) Notice: Subject to any disclaimer, the term of this patent is extended or adjusted under 35 U.S.C. 154(b) by 0 days.

(21) Appl. No.: 14/891,818

(22) PCT Filed: May 21, 2014

(86) PCT No.: PCT/IB2014/061577
§ 371 (c)(1),
(2) Date: Nov. 17, 2015

(87) PCT Pub. No.: WO2014/188346
PCT Pub. Date: Nov. 27, 2014

(65) Prior Publication Data
US 2016/0145495 A1   May 26, 2016

(30) Foreign Application Priority Data
May 21, 2013 (IT) .............................. MI2013A0826

(51) Int. Cl.
*C10B 39/02* (2006.01)
*C10B 39/08* (2006.01)
(Continued)

(52) U.S. Cl.
CPC .............. *C10B 39/08* (2013.01); *C10B 39/02* (2013.01); *C10B 39/10* (2013.01); *C10B 39/12* (2013.01);
(Continued)

(58) Field of Classification Search
CPC ........... C10B 39/02; C10B 39/04; C10B 39/08
See application file for complete search history.

(56) References Cited

U.S. PATENT DOCUMENTS 2,840,922 A * 7/1958 Erisman ................ F26B 11/028
                                                          34/135
4,474,138 A * 10/1984 Remmers ................ C10B 39/02
                                                          122/7 R
(Continued)

FOREIGN PATENT DOCUMENTS

CN    103087734 A    5/2013
WO    8803549 A1    5/1988

OTHER PUBLICATIONS

International Preliminary Report on Patentability of PCT/IB2014/061577 of Sep. 11, 2015.

*Primary Examiner* — In Suk Bullock
*Assistant Examiner* — Jonathan Miller
(74) *Attorney, Agent, or Firm* — Silvia Salvadori, P.C.; Silvia Salvadori

(57) ABSTRACT

A method is described for quenching coke coming from the distillation of coal and having a temperature higher than or equal to 900° C., comprising the steps of a) lowering the temperature of said coke to about 700-300° C. by heat exchange with a fluid through walls of a thermally conductive material interposed between coke and fluid, b) feeding a continuous flow of said coke at about 700-300° C. into a turbo-cooler (T), comprising a cylindrical tubular body (18), closed at opposite ends by respective end plates (19,20), provided with an optional cooling jacket (21) for the inner wall thereof, at least one inlet opening (9) for the coke, at least one inlet opening (10, 15, 16) for water, at least one discharge opening (11, 12) and a rotor, rotatably supported in the cylindrical tubular body (5) and comprising a shaft (13) provided with elements (14) projecting radially from
(Continued)

said shaft, adapted for the handling and advancement of the coke; c) feeding a continuous flow of water at a temperature less than or equal to 100° C. into the turbo-cooler (T), through said at least one inlet opening (10, 15, 16) and subjecting said flow of coke and water to the action of the rotor, which advances the coke towards said at least one discharge opening (11); d) continuously discharging from said at least one discharge opening (11, 12) a flow of coke at a temperature lower than or equal to 200° C., and a flow of water vapor.

16 Claims, 3 Drawing Sheets

(51) Int. Cl.
| | | |
|---|---|---|
| | *C10B 39/12* | (2006.01) |
| | *F27D 15/02* | (2006.01) |
| | *F28C 3/12* | (2006.01) |
| | *F28D 7/00* | (2006.01) |
| | *F28D 7/10* | (2006.01) |
| | *C10B 39/10* | (2006.01) |
| | *C10L 9/08* | (2006.01) |
| | *F28D 21/00* | (2006.01) |

(52) U.S. Cl.
CPC ................. *C10L 9/08* (2013.01); *F27D 15/02* (2013.01); *F27D 15/0286* (2013.01); *F28C 3/12* (2013.01); *F28D 7/0041* (2013.01); *F28D 7/106* (2013.01); *F28D 21/0001* (2013.01); *C10L 2290/06* (2013.01); *F28D 2021/0045* (2013.01)

(56) References Cited

U.S. PATENT DOCUMENTS

| | | | | | |
|---|---|---|---|---|---|
| 4,574,744 | A | * | 3/1986 | Lorenz | C10B 39/02 110/234 |
| 4,588,479 | A | | 5/1986 | Weber et al. | |
| 4,627,174 | A | * | 12/1986 | Hedden | C10B 57/10 201/39 |
| 5,622,604 | A | * | 4/1997 | Gerstenkorn | C10B 39/02 165/90 |
| 6,077,399 | A | * | 6/2000 | Calderon | C10B 39/04 201/35 |
| 7,877,896 | B2 | * | 2/2011 | Cerea | F26B 17/205 34/312 |
| 2002/0009400 | A1 | * | 1/2002 | Conochie | B01J 8/0005 422/198 |
| 2012/0305379 | A1 | * | 12/2012 | Coolidge | C10B 39/04 201/16 |
| 2014/0251784 | A1 | * | 9/2014 | Thielert | C10B 39/02 201/39 |

* cited by examiner

PROCESS AND APPARATUS FOR QUENCHING COKE

This application is a U.S. national stage of PCT/IB2014/061577 filed on 21 May 2014, which claims priority to and the benefit of Italian Application No. MI203A000826, filed on 21 May 2013, the contents of which are incorporated herein by reference in their entireties.

FIELD OF APPLICATION

The present invention refers to the technical field of the metallurgical industry.

In particular, the invention refers to a process for quenching coke produced by distillation of coal (coking) and to a plant for carrying out such process.

KNOWN ART

Coke is used as a fuel and as a reducing agent in melting furnaces for ores i.e. in blast furnaces; coke is obtained by refining processes of coal so-called coking plants, which usually are a part of the complex of a steel plant. The coking plant comprises furnaces made of a series of cells internally coated with silica or silico-aluminous refractory bricks, placed next to one another in a battery.

Coal is hermetically closed in cells, which are heated from outside by the flames of a gas burning in the cavity between one cell and the other. Coal remains in the cells at a temperature of about 1200-1300° C. for a time of 14/24 hours, during which a good portion of sulfur and volatile matter is released and acquires the characteristics of porosity and mechanical resistance needed for its use in the blast furnace.

In the blast furnace coke acts as a fuel and leads to the temperature necessary for the different chemical reactions to occur, thus producing the reduction of iron ores, and scarries out the carburation of iron.

At the end of the coking phase, coke the temperature of which is of about 1200-1300° C., is withdrawn from the furnace by means of a suitable drawing machine.

Coke is then cooled through a process called quenching.

Techniques are known for ("wet") and ("dry") quenching of coke. The first one involves the transfer of the coke withdrawn from a furnace onto a quenching car for feeding it to a quenching tower.

In the quenching tower a large amount of water is poured onto the coke in order to rapidly bring its temperature from 1200-1300° C. to a temperature close to ambient temperature.

The quenching towers are generally equipped with suitable baffles for retaining the particulate entrained by the flow of water vapor that is generated.

The "wet" technique mentioned above has numerous and significant drawbacks, just with reference to the quenching phase of coke.

The major drawback lies in the significant amounts of condensed polycyclic hydrocarbons which are emitted together with the steam exiting from the quenching towers. The treatment with water of coke, the temperature of which is of about 1200-1300° C., in fact gives rise to a sort of steam distillation, in which the water vapor released from the quenching towers entrains also various organic substances, among which the aromatic polycyclic hydrocarbons (IPA), as for example anthracene, acenaphthene, benzopyrene, benzofluoranthene, phenanthrene and chrysene, which are well known for their high toxicity and carcinogenity.

The baffles retaining the particulate provided in the quenching towers are not able to block the totality of emissions of the above mentioned toxic and carcinogenic organic substances into the environment.

A further drawback is due to the dispersion of a huge quantity of thermal energy occurring when coke is quenched through a simple pouring of water onto it, without any recovery of such thermal energy.

The second technique mentioned before, i.e. the "dry" one, defined with the acronym CDQ ("Coke Dry Quenching") is a process for quenching coke performed without the aid of water.

Coke is transferred to a suitable hopper, in which a flow of inert gas (for example nitrogen) is the heat exchange means. The gas passing through the coke gets overheated while the coke cools down. CDQ plants are very complex and of great size and for such reasons they are generally built where there is no water available in the liquid state.

The problem underlying the present invention was therefore to provide for a process for quenching coke produced by coking, so as to guarantee a strict control of the emissions not only of particulates but also and especially of organic volatile substances in a steam flow and in particular of polycyclic aromatic hydrocarbons, and also to permit a substantial recovery of thermal energy developed during the quenching phase.

SUMMARY OF THE INVENTION

Such problem has been solved according to the invention by a method for quenching coke derived from the distillation of coal and having a temperature higher than or equal to 900° C., comprising the steps of a) lowering the temperature of said coke to about 700-300° C. by heat exchange with a fluid through walls of thermally conductive material interposed between coke and fluid, b) feeding a continuous flow of said coke into a turbo-cooler (T), comprising a cylindrical tubular body, closed at opposite ends by respective end plates, provided with an optional cooling jacket for the inner wall thereof, at least one inlet opening for the coke, at least one inlet opening for water, at least one discharge opening and a rotor, rotatably supported in the cylindrical body and comprising a shaft provided with elements projecting radially from said shaft, adapted for the handling and advancement of the coke;

c) feeding a continuous flow of water at a temperature less than or equal to 100° C. into the turbo-cooler, through said at least one inlet opening and subjecting said flow of coke and water to the action of said rotor, which advances the coke towards said at least one discharge opening;

d) continuously discharging from said at least one discharge opening a flow of coke at a temperature lower than or equal to 200° C., and a flow of water vapor.

In one aspect of the present invention, the aforesaid fluid for lowering the temperature of coke in step a) is water and in such case in step a) steam at high temperature is generated.

In another aspect, the aforesaid fluid for lowering the temperature of coke in step a) is diathermic oil and in such case the diathermic oil brought to high temperature through heat exchange with the coke is used as a vector and as a heat source in a circuitry for energy recovery.

Preferably the aforesaid continuous flow of water is fed into the turbo-cooler through manifolds arranged longitudinally and externally to said cylindrical tubular body and said at least one inlet opening for the water comprises at least one opening located at one end of said manifolds and a plurality of nozzles branching off from said manifolds and leading to the inner wall of the cylindrical tubular body along its entire length.

Preferably said at least one inlet opening for water also includes a plurality of nozzles for introducing water, formed on said shaft of the rotor.

Preferably the method according to the invention comprises a step of feeding said high-temperature steam generated in step a) to an energy generator for energy recovery.

In another preferred embodiment, the method according to the invention comprise a step of feeding said diathermic oil, brought to a high temperature as a result of heat exchange with the coke, to a generator for energy recovery According to a preferred embodiment, the method according to the present invention comprises a step of recovering the heat of water vapor discharged from the turbo-cooler in step d), which has a temperature of about 600-200° C., for a heat exchange with water having a temperature below 70° C., preferably of about 10-50° C., and consequently producing hot water (temperature less than 100° C.) for various usages and for waste-to-energy use, and steam at a temperature higher than 100° C., generally of about 400-120° C.

The steam exiting from this heat exchange step is subjected to washing steps, for example using a scrubber, and condensation steps, thus obtaining water which can be fed again to the quenching process, and sludge, which can be dried and pelletized.

Such sludge, having substantially the same chemical composition of the coke, can be sent to a recovery cycle.

The aforementioned step a) of lowering the temperature of said coke to about 700-300° C. is preferably carried out by the steps of
- providing a conduction boiler having a base with a polygonal section, a casing with walls made of thermally conductive material, preferably metal, and a plurality of baffles of heat conductive material, preferably metal, extending side by side to each other and vertical relative to the base, wherein ducts of thermally conductive material, preferably metal, are applied on said walls and on said baffles and extend in the vertical direction relative to the base, said ducts being in fluid communication with each other and connected to form a sort of serpentine provided with inlet and outlet for the aforementioned fluid; and
- introducing coke having a temperature higher than or equal to 900° C. into the boiler in spaces defined between the baffles and between the baffles and the walls, so as to transmit the heat of coke to the fluid circulating in said ducts and generate steam at a high temperature in output from these.

According to an aspect of the invention, water is fed through the inlet of said serpentine and steam at high temperature (about 350-450° C.) is discharged through the outlet of said serpentine.

According to another aspect, the fluid introduced into the serpentine through said inlet is a diathermic oil, which is discharged through the aforesaid outlet at a temperature lower than 300° C., preferably between 200 and 280° C.

In a further aspect, the present invention also concerns a plant for carrying out the aforesaid process, according to any one of claims 14-16.

The present invention so relates to a hybrid technology, which can be defined "dry" in the first step and "wet" in the second one.

By sequentially applying the two steps, a plant with reduced dimensions has been obtained, together with the advantages consisting in energy recovery and containment of gaseous emission in the atmosphere.

The present invention will be further illustrated with reference to the schematic drawings here annexed, and also to some embodiments here described in the following by way of illustration and not of limitation.

DETAILED DESCRIPTION OF A PREFERRED EMBODIMENT

Figure 1:
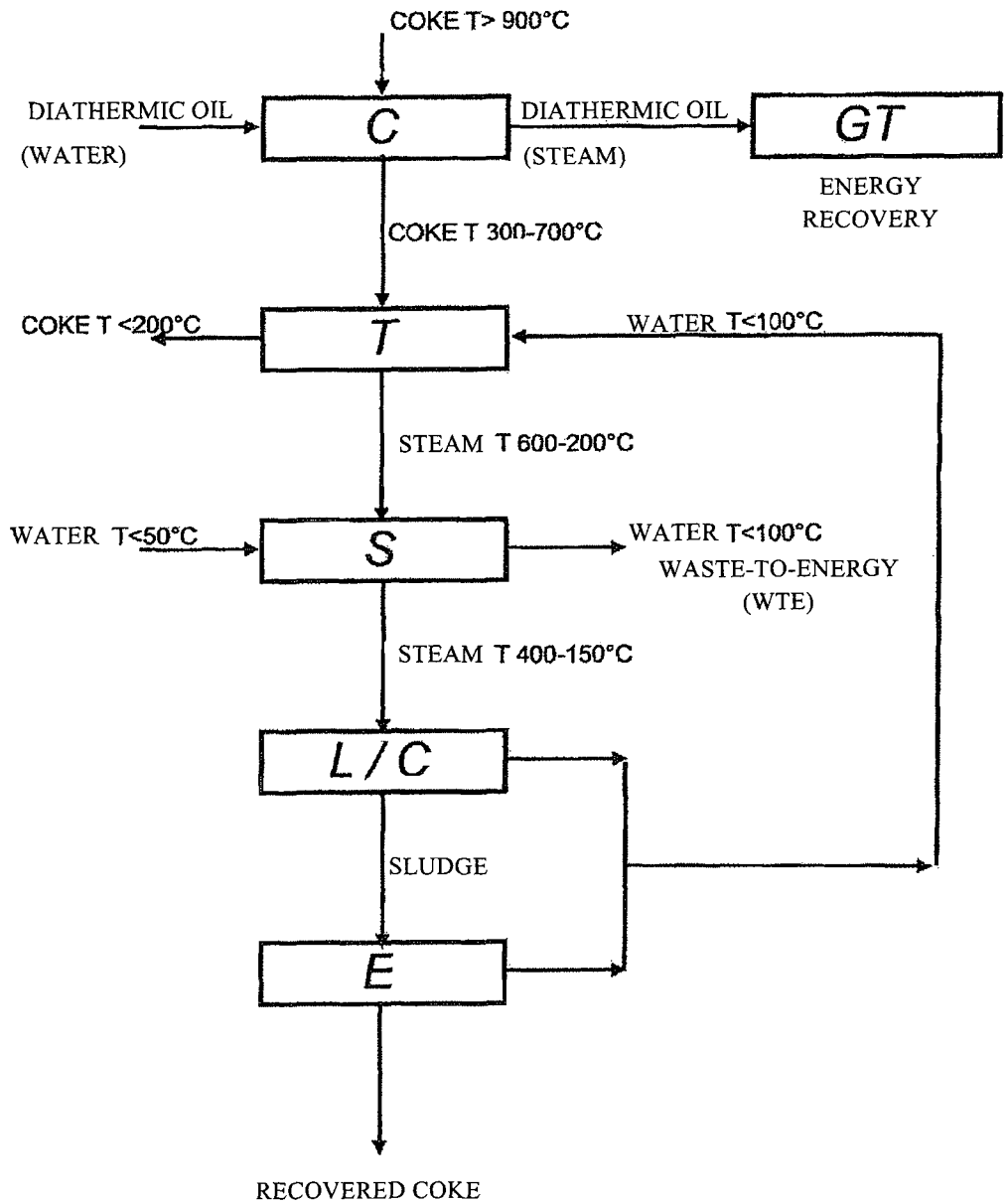
FIG. 1 is a block diagram relating to an embodiment of the process according to the invention.

In one of its embodiments, the process according to the present invention, with reference to the block diagram of FIG. 1, comprises feeding coke coming from the coking step and having a temperature higher than or equal to 900° C. into a conduction boiler C, in which a portion of the heat of coke is transferred to water circulating in such boiler for producing steam at a high temperature of about 300-500° C., which is fed to a turbine generator GT for energy recovery.

Figure 2:
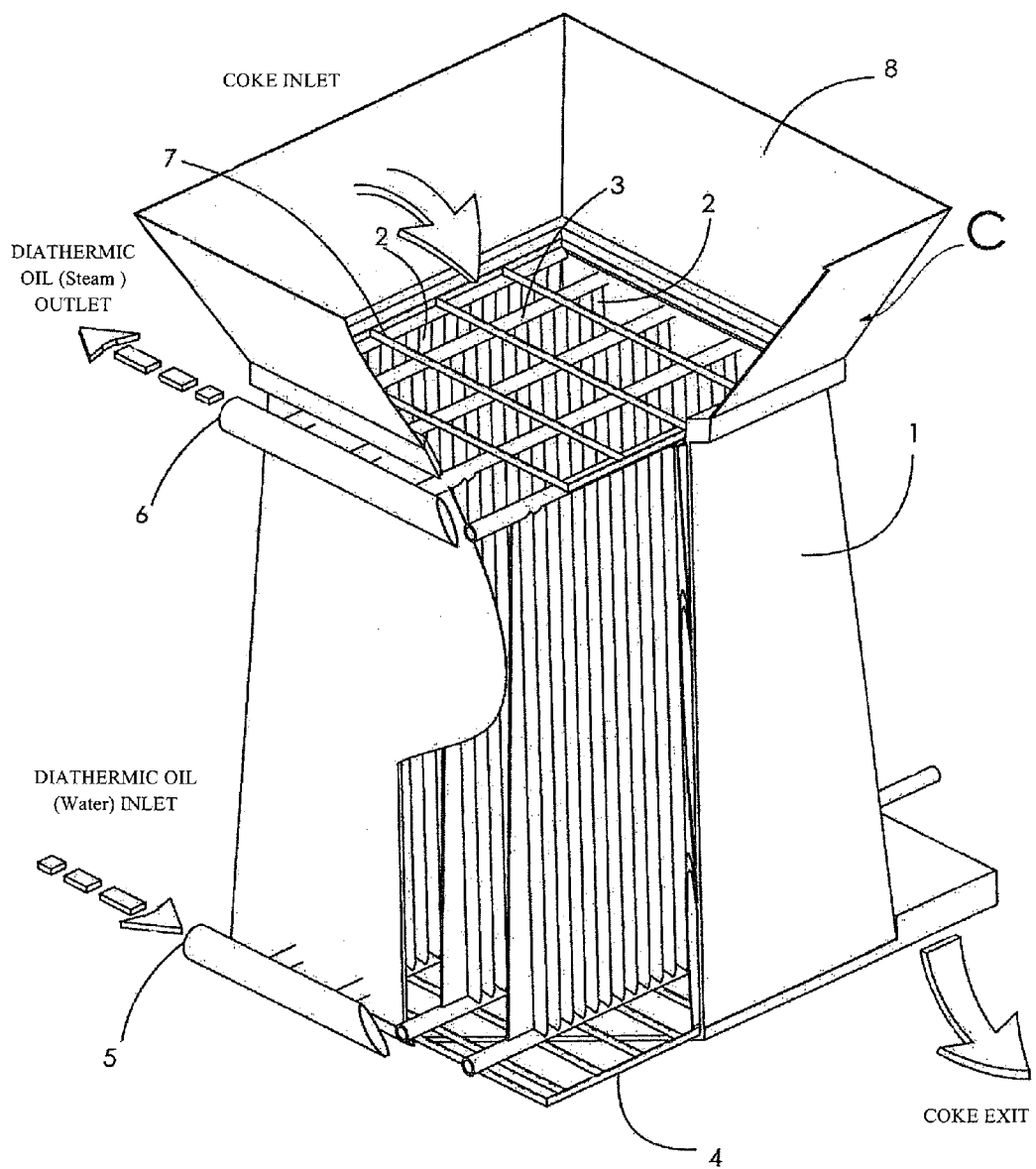
FIG. 2 is a schematic perspective representation of a conduction boiler usable in the process according to the invention and FIG. 3 is a schematic representation of a turbo-cooler used in the process according to the present invention.

An example of a conduction boiler usable in the process according to the present invention is now described with reference to FIG. 2. A boiler C of this type has the shape of a truncated pyramid with a substantially rectangular base with walls 1 made of metal material and refractory mortars, at the inside of which ducts 2 of metal material are applied with a circular section, said ducts extending vertically with respect to the base.

The ducts 2 of each wall 1 are in fluid communication with each other and connected to form a sort of serpentine provided with inlet 5 for water and outlet 6 for steam.

Inside the walls 1 of the boiler C there are arranged a plurality of baffles 3 of metal material, extending vertically with respect to the base of the boiler. Ducts 2 of metal material with circular section and extending perpendicularly with respect to the base are applied onto said baffles. Also the ducts of each baffle 3 are in fluid communication with each other and connected to form a sort of serpentine provided with inlet 5 for water and outlet 6 for steam.

At the base of the boiler a drawer 4 is disposed, serving to progressively discharge coke exiting from the boiler C.

Coke coming from the coking phase and having a temperature higher than or equal to 900° C. is then fed into the boiler C by means of a conveyor, for example a chain or belt conveyor, from which coke is discharged onto a distributor 7 placed at the top of the conduction boiler C. The distributor 7 assures an uniform feeding of coke in the various compartments of the boiler defined by the baffles 3 and the walls 1.

On the top of the boiler C a hopper 8 collects the hot coke at the inlet of the boiler. The hopper 8 is made of a metal material internally coated with refractory mortars.

The coke fed to the upper portion of the boiler gradually gives part of its thermal energy to the water circulating in the serpentines formed by the ducts 2 applied to the walls 1 and the baffles 3 and is gradually lowered within the boiler due to the coke removal from the bottom of the boiler, once it has reached a temperature of 700-300° C., by means of the drawer 4.

Water circulating in the aforementioned serpentines, due to the heat exchange with coke, is converted into steam at a high temperature of about 300-500° C., which, as mentioned before, is fed into the turbine generator GT for energy recovery.

Water enters the serpentine of the boiler C through the manifold 5 and branches from it to all vertical ducts 2. Coke gives its heat to water both by conduction and radiation, so generating steam, which is transferred to the top of the boiler exits therefrom through the manifold 6.

As an alternative, as a cooling fluid instead of water a diathermic oil can be used, which also enters the serpentine of the boiler C through the manifold 5 and, after having been branched to the vertical ducts 2, exits from the boiler through the manifold 6, at a temperature lower than 300° C., preferably between 200 and 280° C.

It is possible to envisage feeding a flow of inert gas, generally nitrogen or carbon dioxide, in countercurrent to the flow of coke, in order to lower the amount of oxygen inside the boiler. The feeding of the flow of inert gas can be continuous or just for determined time intervals.

Coke discharged through the drawer 4 is fed to a turbo-cooler T.

Figure 3:
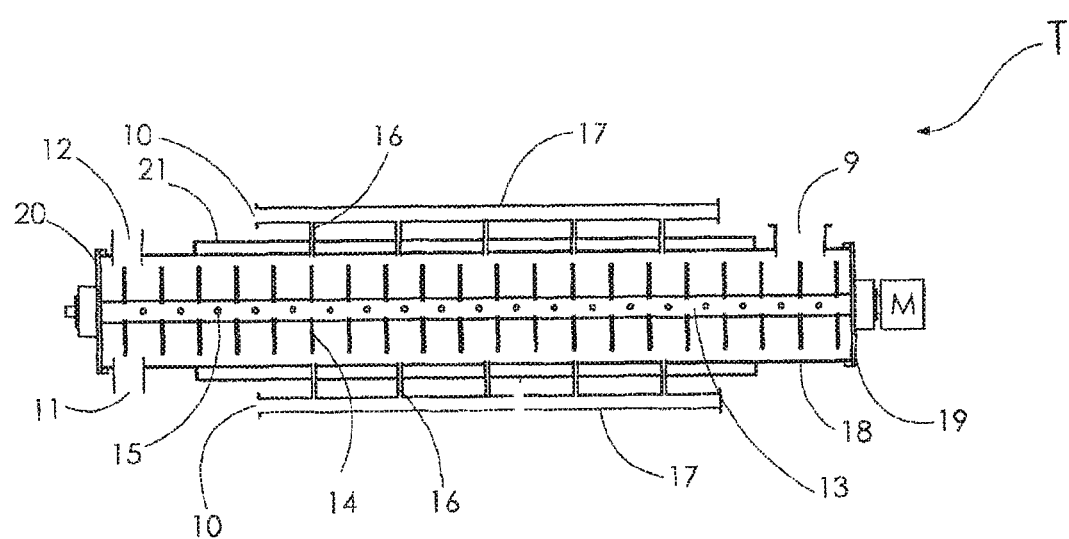

The turbo-cooler T shown in FIG. 3 comprises a cylindrical tubular body 18, closed at opposite ends by respective end plates 19, 20, provided with a cooling jacket 21 for the inner wall thereof, intended for being run by a cooling fluid, generally constituted by water, an inlet opening 9 for coke, an inlet opening 10 for water from a set of manifolds 17 provided with nozzles 16, a discharge opening 11 for the cooled coke, a discharge opening 12 for steam and a rotor, rotatably supported in the cylindrical body and comprising a shaft 13 provided with radially projecting elements 14, which are, for example, rod-, paddle- or plough-shaped and adapted to facilitate the advancement of coke and its mixing with water. A plurality of nozzle-shaped openings 15 is present in the shaft 13, for admitting water into the cylindrical tubular body 18.

Coke is then fed into the turbo-cooler T through the inlet opening 9 placed near the end plate 19 whereas water intended for cooling the coke is fed through the inlet opening 10 of the manifolds 17 to the nozzles 16 located on the cylindrical body of the turbo-cooler and through the other inlet openings consisting of the nozzles 15 on the shaft 13 of the rotor.

Since its entrance into the turbo-cooler, coke is submitted to the mechanical action of the rotor, rotated at speed lower than or equal to 100 rpm, preferably 1-50 rpm, with subsequent contact of the coke against the inner wall of the cylindrical tubular body 18, which is cooled by the jacket 21 run by water at a temperature lower than 100° C., preferably of about 10-50° C., and advancement towards the discharge opening 11. The elements 14 of the rotor 13 also act on the water, which is continuously introduced inside the tubular cylindrical body 18 through the inlet opening 10 and the nozzles 15 and 16, bringing it to intimate contact with the coke.

Therefore both an indirect heat exchange between coke and the cooled inner wall of the cylindrical tubular body 18 and a direct heat exchange between coke and the water admitted inside the cylindrical tubular body 18 are made.

Result is that it is possible to obtain a lowering of the temperature of coke from 700-300° C. to 200-100° C. with a continuous process and with a residence time of coke inside the turbo-cooler not longer than 30 minutes.

The steam which is generated inside the turbo-cooler following the heat exchange between coke and water and which has a temperature of about 600-200° C. is discharged through the discharge opening 12 and transferred to the heat exchanger S, schematically shown in FIG. 1.

Here a heat exchange is carried out with water entering at a temperature lower than or equal to 50° C., typically 15-30° C., for bringing it to a temperature of about 70-100° C., so as it can be used with waste-to-energy techniques.

Steam exiting from this heat exchange step, which still has a temperature higher than 100° C., typically of about 150-300° C., is subjected to washing and condensation steps, for example in a scrubber-condenser, schematically indicated with L/C in FIG. 1, from which water is obtained, which can be reused in the quenching process inside the turbo-cooler T, and sludge, which can be dried in the dryer schematically indicated with E in FIG. 1, with recovery of condensed water, which can be returned to the turbo-cooler T. Finally the dried sludge, which substantially has the same chemical composition of coke, can follow a suitable recovery cycle.

The present invention will be further described with reference to an example of implementation of the process, given by way of illustration and not of limitation.

EXAMPLE

Coke deriving from a coking phase and having a temperature of about 1100° C. was discharged from the top into the conduction boiler C, with a mass flow-rate of 1000 kg/h, and placed into contact with the ducts 2 applied onto the walls 1 and the baffles 3 and fed with diathermic oil at about 230° C. with a flow-rate of 2800 kg/h. Coke was periodically removed from the bottom of the boiler C by means of the drawer 4, after an average residence time inside the boiler of 150 minutes.

Following the heat exchange performed by conduction and radiation between coke and the diathermic oil in the ducts 2, the diathermic oil was brought to a temperature of about 300° C., always with a flow-rate of 2800 kg/h, and was transferred to a generator for energy recovery.

Coke exiting from the boiler, having a temperature of about 400° C., was continuously fed with a flow-rate of about 1000 kg/h, to the inside of a turbo-cooler T as described before, through the inlet opening 9. At the same time, through the opening 10 and the nozzles 15 and 16, water was introduced into the turbo-cooler T at a temperature of about 60° C. with a total flow-rate of 150 kg/h.

In the jacket of the turbo-cooler T water was circulated at an initial temperature of about 40° C.

The shaft 13 of the paddled rotor was rotated at a speed of 5 rpm and after an average residence time of 15 minutes coke was continuously discharged from the discharge opening 11 at a temperature of about 100° C., whereas a continuous flow of water vapor was discharged from the opening 12, at a temperature of about 400° C.

Coke exiting from the turbo-cooler was transferred to the subsequent working steps of the iron and steel industry, in particular to the agglomeration step.

Steam was instead transferred to the aforementioned heat exchange steps with generation of hot water for waste-to-energy use, scrubbing and condensation, drying of the coke sludge. The condensed and cooled steam was resent in a closed cycle to the turbo-cooler.

The invention claimed is:
1. A method for quenching coke coming from the distillation of coal and having a temperature higher than or equal to 900° C., comprising the steps of:

a) lowering the temperature of said coke to about 700-300° C. by heat exchange with a fluid through walls of a thermally conductive material interposed between the coke and the fluid, b) feeding a continuous flow of said coke at about 700-300° C. into a turbo-cooler, comprising a cylindrical tubular body, closed at opposite ends by respective end plates provided with a cooling jacket for the inner wall thereof, at least one inlet opening for the coke, at least one inlet opening for water, at least one discharge opening and a rotor, rotatably supported in the cylindrical tubular body and comprising a shaft provided with elements projecting radially from said shaft, adapted for the handling and advancement of the coke;

c) feeding a continuous flow of water at a temperature less than or equal to 100° C. into the turbo-cooler, through said at least one inlet opening for the water and subjecting said flow of coke and water to the action of the rotor, which advances the coke towards said at least one discharge opening;

d) continuously discharging from said at least one discharge opening a flow of coke at a temperature lower than or equal to 200° C., and a flow of water vapor.

2. The process according to claim 1, wherein said fluid used for the heat exchange with the coke in step a) is diathermic oil.

3. The process according to claim 1, wherein said fluid used for the heat exchange with the coke in step a) is water, which, as a result of the heat exchange, is converted into steam at high temperature.

4. The process according to claim 1, wherein said continuous flow of water is fed into the turbo-cooler through manifolds arranged longitudinally and externally to said cylindrical tubular body and said at least one inlet opening for the water comprises at least one opening located at one end of said manifolds and a plurality of nozzles branching off from said manifolds and leading to the inner wall of the cylindrical tubular body along its entire length.

5. The process according to claim 1, wherein said at least one inlet opening for water also includes a plurality of nozzles for introducing water, formed on said shaft of the rotor.

6. The process according to claim 3, comprising a step of feeding said high-temperature steam generated in step a) to a generator for energy recovery.

7. The process according to claim 2, comprising a step of feeding said diathermic oil, brought to a high temperature as a result of heat exchange with the coke, to a generator for energy recovery.

8. The process according to claim 1, comprising a step of
carrying out a heat exchange between the water vapor discharged from the turbo-cooler in step d), which has a temperature of about 600-200° C., and water having a temperature below 70° C.,
obtaining water at temperature less than 100° C., for waste-to-energy use, and steam at a temperature higher than 100° C.

9. The process according to claim 8, wherein said steam at a temperature higher than 100° C. obtained by the heat exchange with water is subjected to washing and condensation steps, thus obtaining water that can be fed again to the turbo-cooler in step c), and sludge, which is dried.

10. The process according to claim 9, wherein said dried sludge, having substantially the same chemical composition of the coke, is sent to a recovery cycle.

11. The process according to claim 1, wherein said step a) of lowering the temperature of said coke to about 700-300° C. is carried out by the steps of
providing a conduction boiler having a base with a polygonal section, a casing with walls made of the thermally conductive material and a plurality of baffles of heat conductive material extending side by side to each other and vertical relative to the base, wherein ducts of thermally conductive material are applied on said walls and on said baffles and extend in the vertical direction relative to the base, said ducts being in fluid communication with each other and connected to form a sort of serpentine provided with inlet for water and outlet for steam and
introducing the coke having a temperature higher than or equal to 900° C. into the boiler in spaces defined between the baffles and between the baffles and the walls, so as to transmit the heat of the coke to the water circulating in said ducts and generate the steam at a high temperature in output from them.

12. The process according to claim 1, wherein said step a) of lowering the temperature of said coke to about 700-300° C. is carried out by the steps of
providing a conduction boiler having a base with a polygonal section, a casing with walls made of the thermally conductive material and a plurality of baffles of heat conductive material extending side by side to each other and vertical relative to the base, wherein ducts of thermally conductive material, are applied on said walls and on said baffles and extend in the vertical direction relative to the base, said ducts being in fluid communication with each other and connected to form a sort of serpentine provided with inlet and outlet for diathermic oil, and
introducing the coke having a temperature greater than or equal to 900° C. into the boiler in spaces defined between the baffles and between the baffles and the walls so as to transmit the heat of the coke to the diathermic oil circulating in the said conduits and obtain the diathermic oil at high temperature in output from them.

13. The process according to claim 11, comprising the step of feeding into said conduction boiler a flow of inert gas in countercurrent to the flow of coke.

14. An apparatus for carrying out the process according to claim 11, comprising:
a conduction boiler having a base with a polygonal section, a casing with walls made of thermally conductive material and a plurality of baffles of heat conductive material, extending side by side to each other and vertical with respect to the base, wherein ducts of thermally conductive material, are applied on said walls and on said baffles and extend in the vertical direction relative to the base, said ducts being in fluid communication with each other and connected to form a sort of serpentine provided with an inlet for a fluid selected from water and diathermic oil and outlet for the fluid after passing through the conduction boiler, wherein the water is water vapor and the diathermic oil is heated diathermic oil, and
a turbo-cooler, comprising a cylindrical tubular body, closed at opposite ends by respective end plates, provided with a cooling jacket for the inner wall thereof, at least one inlet opening for the coke, at least one inlet opening for water, at least one discharge opening and a rotor, rotatably supported in the cylindrical tubular body and comprising a shaft provided with elements projecting radially from said shaft, adapted for the handling and advancement of the coke.

15. The apparatus according to claim 14, wherein said turbo-cooler comprises a plurality of manifolds arranged longitudinally and externally to said cylindrical tubular body and said at least one inlet opening for water of said turbo-cooler comprises at least one opening located at one end of said manifolds and a plurality of nozzles branching off from said manifolds and leading into the inner wall of the cylindrical tubular body along its entire length.

16. The apparatus according to claim 15, wherein said at least one inlet opening for water also includes a plurality of nozzles for introducing water, formed on said shaft of the bladed rotor.

* * * * *